No. 893,825.
PATENTED JULY 21, 1908.
C. W. O. WITTKE.
FLUID MOTOR.
APPLICATION FILED SEPT. 3, 1907.
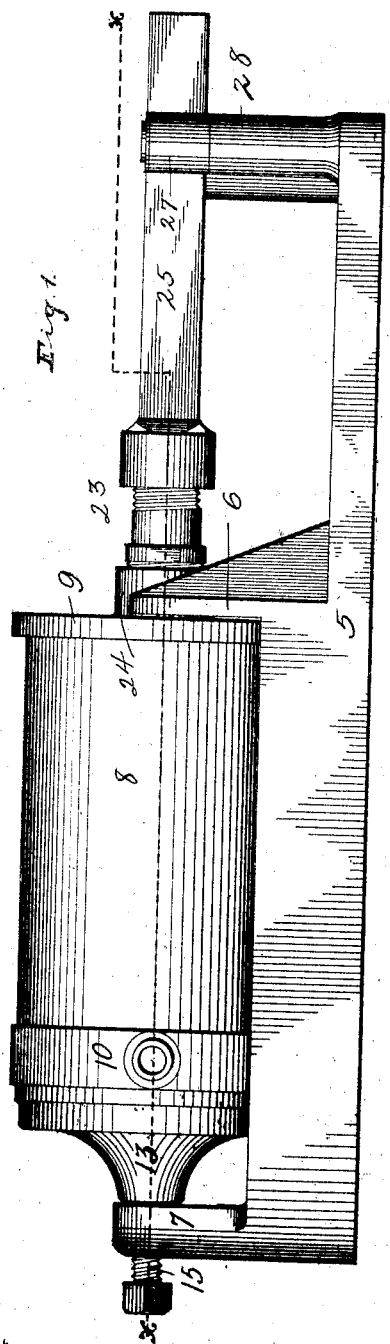
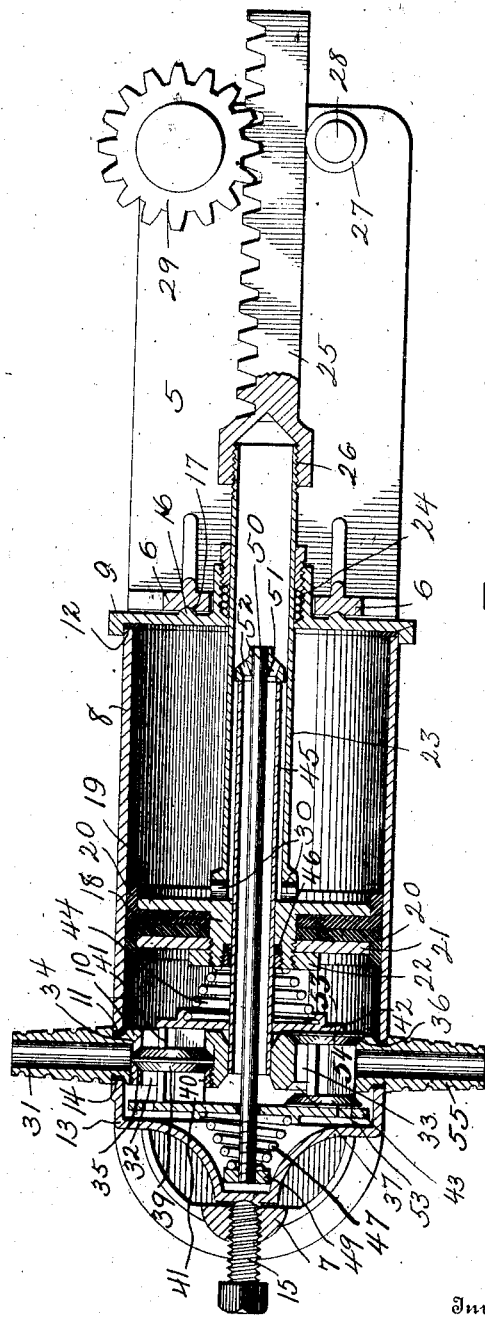
Witnesses
Carl Stoughton
F. G. Campbell
Inventor
Carl W. O. Wittke.
By Chester C. Shepherd
Attorney

UNITED STATES PATENT OFFICE.

CARL W. O. WITTKE, OF COLUMBUS, OHIO.

FLUID-MOTOR.

No. 893,825.  Specification of Letters Patent.  Patented July 21, 1908.

Application filed September 3, 1907. Serial No. 391,210.

*To all whom it may concern:*

Be it known that I, CARL W. O. WITTKE, citizen of the United States, residing at Columbus, in the county of Franklin and State of Ohio, have invented certain new and useful Improvements in Fluid-Motors, of which the following is a specification.

My invention relates to fluid motors of the class commonly known as water motors and has for its object the provision of a device of this character constructed in such manner that it may be very cheaply made, will contain but very few parts and may be readily assembled and mounted for use.

Further objects and advantages of the invention will be set forth in the detailed description which now follows.

In the accompanying drawing: Figure 1 is a side elevation of a water motor constructed in accordance with the invention, and, Fig. 2 is a horizontal section upon line x—x of Fig. 1.

Like numerals designate corresponding parts in both of the figures of the drawing.

Referring to the drawing, the numeral 5 designates a base which is provided with upstanding ribs 6 intermediate the ends thereof and an upstanding lug 7 at the rear end thereof. The motor proper comprises a cylinder 8, one end of which is closed by a head 9 and the other end of which is closed by a valve casing 10. Gaskets 11 and 12 are adapted to be clamped between the valve casing 10 and the cylinder 8 and between the cylinder 8 and the head 9 when a cap 13 is forced into engagement with a gasket 14 located between the cap 13 and the valve casing 10. This cap is forced into engagement with the gasket 14 by means of a set screw 15 which is threaded into the extension 7. The head 9 is provided with bosses 16 and these bosses enter recesses 17 formed in the ribs 6. It will therefore be seen that the parts may be clamped together by screwing the screw 15 up. The head 9 and the valve casing 10 will therefore form a water-tight connection with the cylinder 8 without employing threads.

A piston which comprises a sleeve 18 having the plate 19 integrally formed therewith is slidably disposed within the cylinder 8. Leather packing rings 20 are clamped between the plate 19 and a plate 21, said plate being threaded upon the sleeve 18. A nut 22 is also threaded upon this sleeve to hold the plate 21 securely in position. A tubular piston rod 23 is integrally formed with the sleeve 20 and projects through a stuffing box 24 of the usual and well known construction, said stuffing box being located in the head 9. A rack bar 25 is threaded upon the outer end of this tubular piston rod as at 26, this structure not only forming a connection between the tubular piston rod and the rack bar, but the rack bar serving as a closure for the open end of the tubular piston rod. The rear face of the rack bar bears against an anti-friction roller 27 which is mounted for rotation upon a stud 28. A pinion 29 meshes with this rack bar and this pinion is adapted to impart movement to the member to be driven.

Ports 30 are formed through the hollow piston rod adjacent the right hand side of the piston. An intake pipe 31 adapted to have a rubber hose connected thereto is integrally formed with the valve casing. Ports 32 and 33 are formed through the valve casing and valve seats 34, 35, 36 and 37 are formed in these ports. An intake valve 39 adapted to contact with the seat 34 when at one of its limits of movement and adapted to contact with the seat 35 at its other limit of movement is mounted within the valve casing. A nut 40 limits the movement of this valve in one direction and this valve is provided with projections 41 adapted to be engaged by plates 42 and 43. A spring 44 is carried by the plate 42 and is adapted to be engaged by the piston at the end of the movement of the piston toward the left in Fig. 2. A tube 45 is driven into the valve casing and projects into the hollow piston rod. A stuffing box 46 is formed within the sleeve 18 of the piston to permit the piston to slide upon the tube 45, while at the same time maintaining a water-tight joint between the piston and the tube. A spring 47 is carried by the plate 43 and the head 49 of a rod 50 is adapted to engage this spring, as will be hereinafter described. Upon its opposite end the rod 50 carries a head 51 having ports 52 formed therethrough and this head is larger in diameter than the tube 45 so that as the piston moves toward the right in Fig. 2, it will engage this head. Exhaust valves 53 are connected by a rib 54 and are adapted to engage the seats 36 and 37.

The operation of the device is as follows: With the parts in the position shown in Fig. 2, the piston has just completed its movement toward the left and is about to start on its movement toward the right. At the completion of its movement toward the left, the sleeve 18 engaged the spring 44 and slightly compressed this spring. After the spring had been compressed enough, it had acted to throw the valves to the position shown in Fig. 2, the plate 42 abutting the valves for this purpose. Water now enters through the intake pipe 31 and passes to the right of the intake valve 39 and enters the cylinder to drive the piston toward the right. The water at the right hand end of the cylinder at this time flows through the ports 30 to the interior of the hollow piston rod, thence through the ports 52 to the interior of the tube 45, thence to the left hand side of the valve casing and out past the left hand exhaust valve 53 to an exhaust pipe 55. At the completion of the movement of the piston toward the right, the edge of the sleeve 18 abuts against that portion of the head 52 which projects beyond the tube 45. This forces the rod 50 toward the right and the head 49 compresses the spring 47. After this spring has been slightly compressed, it acts to throw the valves with a quick movement to the right, at which time the intake valve 39 will rest against the valve seat 34 and the left hand exhaust valve 53 will rest against the seat 37. Water will now pass from the intake pipe 31 to the left of the intake valve 39 and enter the tube 45, passing from said tube to the interior of the hollow piston rod and out through the ports 30 to the right hand end of the cylinder and acting to force the piston toward the left. The water contained at the left hand end of the piston will be forced out past the right hand exhaust valve 53 and into the exhaust pipe.

From the foregoing description, it will be seen that a motor constructed as herein shown and described, may be very cheaply made. By utilizing the hollow piston rod as a by-pass for the water from one side of the piston to the other, the exterior by-passes usually employed for this purpose are rendered unnecessary with the consequent cheapening of the motor.

The provision of a base having the rib 6 and set screw 15 between which the parts may be longitudinally clamped, provides means for securing all of the parts together in such manner that they will be water-tight without the use of threads and the provision of the pinion 29 and the anti-friction roller 27, provides means for shipping the motor with the piston rod connected to a driven member, so that it is only necessary in using this motor to bring the pinion 29 into engagement with a part to be driven such as a gear or rack.

While the elements shown and described are well adapted to serve the purpose for which they are intended, it is to be understood that the invention is not limited to the precise construction set forth, but includes within its purview such changes as may be made within the scope of the appended claims.

What I claim, is:

1. In a device of the character described, the combination with a base, of fixed members carried by said base, a cylinder having an open rear end, a valve casing adapted to close the rear end of the cylinder, a cap the forward edge of which is adapted to engage the valve casing, and a binding member adapted to bind all of said parts longitudinally against the upstanding members of the base.

2. In a device of the character described, the combination with a base having an upstanding member, of a cylinder having an open rear end, a valve casing adapted to close the rear end of the cylinder, a cap the forward edge of which is adapted to bear against said valve casing, an upwardly extending member carried by the rear end of the base, and a binding member adapted to bind the parts longitudinally between the last named upstanding member and the first named upstanding member of the base.

3. In a device of the character described, the combination with a cylinder, of a piston mounted in said cylinder, a hollow piston rod to which said cylinder is connected there being ports formed through said hollow piston rod adjacent the piston, a valve casing which closes the rear end of the cylinder, a tube rigidly connected to said valve casing and projecting into the hollow piston rod, a rigid member which projects through said tube and is adapted to be engaged by the piston when said piston reaches its limit of movement in one direction, valves mounted within the valve casing and controlling the passage of fluid therethrough, a plate adapted to engage said valves, a spring disposed between said plate and said rigid member, a second plate engaging opposite sides of the valves, and a yielding member disposed between said second plate and the piston.

In testimony whereof I affix my signature in presence of two witnesses.

CARL W. O. WITTKE.

Witnesses:
A. L. PHELPS,
L. CARL STOUGHTON.